May 30, 1961     C. F. CLIFFORD     2,986,686
ELECTRO-MECHANICAL DEVICES
Filed April 6, 1959     2 Sheets-Sheet 1
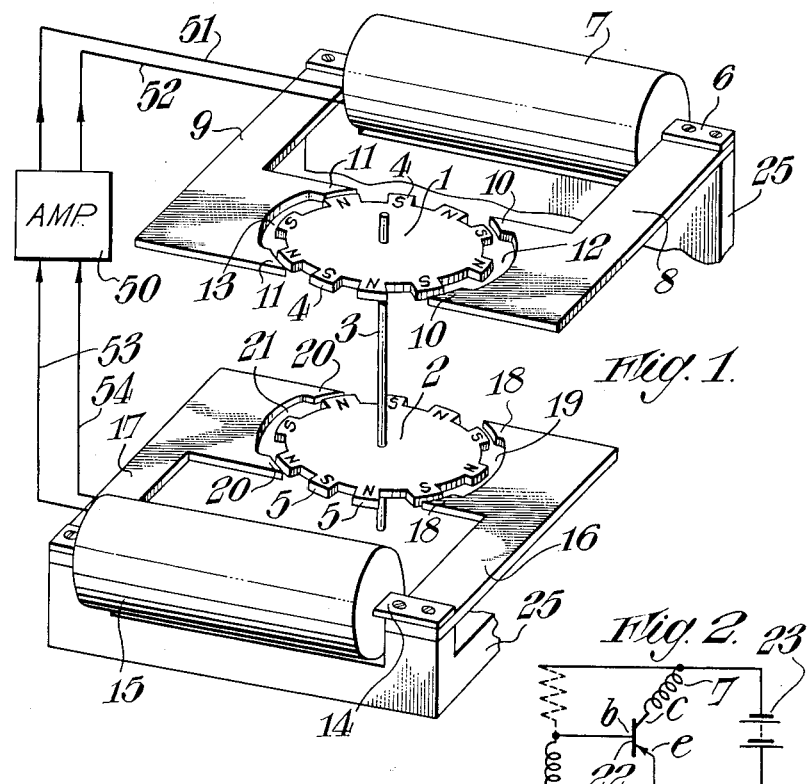
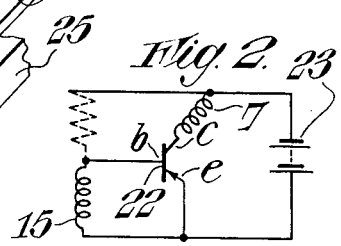
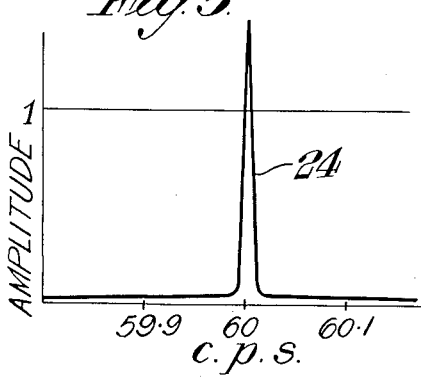
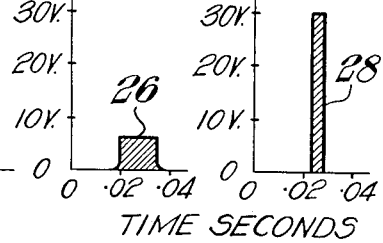

May 30, 1961     C. F. CLIFFORD     2,986,686

ELECTRO-MECHANICAL DEVICES

Filed April 6, 1959     2 Sheets-Sheet 2

United States Patent Office 2,986,686
Patented May 30, 1961

2,986,686
ELECTRO-MECHANICAL DEVICES
Cecil Frank Clifford, Newbridge Works, Bath, Somerset, England
Filed Apr. 6, 1959, Ser. No. 804,510
Claims priority, application Great Britain May 2, 1958
10 Claims. (Cl. 318—254)

This invention relates to electromechanical devices having a rotor which is adapted to rotate at a controlled speed. Embodiments of the invention include constant speed electric motors, electromechanical escapements and electro-mechanical oscillators.

According to the present invention, an electromechanical device comprises at least a rotor provided with a plurality of magnetic poles or pole pieces, a signal coil magnetically connected with at least one rotor magnetic pole or pole piece, an amplifier and a drive coil magnetically connected with at least one other rotor magnetic pole or pole piece, said signal coil being electrically connected to the amplifier to supply an input signal thereto as the rotor rotates and the drive coil being supplied from the output of the amplifier to supply driving impulses to the rotor with which it is magnetically connected, said signal coil being mechanically connected to said drive coil and said magnetic pole or pole piece connected with said signal coil being mechanically connected to said magnetic pole or pole piece connected with said drive coil, one of said mechanical connections comprising a resilient member forming a part of a mechanical oscillatory system, the resonant frequency of which system substantially determines the rotational speed of the said rotor.

An electromechanical device according to the invention, may be constructed so that the signal coil is rigidly connected to the drive coil and, in this case, the rotor comprises a mechanical oscillator system.

Alternatively, the rotor may be of rigid construction, in which case, the signal coil is resiliently connected to the drive coil.

One convenient embodiment of the invention has a rotor which comprises first and second rotor discs, each rotor disc being provided with a plurality of peripheral poles or pole pieces. The two rotor discs are arranged in spaced relationship to each other and are connected by a resilient mechanical connection. Both the rotor discs are mounted on a rotary shaft.

The first and second rotor discs may be mounted directly on the rotary shaft, in which case, the first and second rotor discs together with the intervening section of the rotary shaft form a torsional oscillator.

The first and second rotor discs may alternatively be connected by flexible members other than the rotary shaft, so that the two rotor discs and the connecting flexible members form a torsional oscillator. This mechanical oscillator system is then connected to the rotary shaft by means of a collet.

In a different embodiment of the invention, the rotor is of rigid construction and the signal and drive coils, if desired with associated magnetic core members, are connected to each other by a resilient mechanical connection, such as by crossed leaf springs, so that the signal and drive coils form parts of a mechanical oscillatory system.

In an electric motor according to the invention, the rotary shaft connected to the rotor of the device is driven at a speed controlled by the oscillation of the mechanical oscillator system, the power being derived from the electrical supply to the oscillator amplifier. An escapement mechanism according to the invention has the rotary shaft driven by external means and the speed of rotation is controlled by the frequency of the mechanical oscillatory system.

Both the motor and the escapement embodiments of the invention include an electrically-maintained mechanical oscillator, which is associated with the rotor or with the signal and drive coils as the case may be.

Embodiments of the invention may be embodied in a timepiece. In particular, a constant speed electric motor according to the invention, is well suited to driving a clock mechanism which obtains its power from a low voltage battery supplying a transistor amplifier.

In order that the invention may readily be carried into effect, several embodiments thereof will now be described in detail, by way of example, with reference to the accompanying drawings of which:

Fig. 1 is a diagrammatic perspective view, not to scale, of a constant speed electric motor having two permanent magnetic rotor discs mounted on a common shaft;

Fig. 2 is a schematic circuit diagram of a transistor amplifier for the motor of Fig. 1;

Fig. 3 is a resonance curve referred to in the description of the operation of the motor of Fig. 1;

Fig. 4a and Fig. 4b are voltage-time diagrams referred to in the description of the operation of the motor of Fig. 1;

Fig. 5 is a schematic circuit diagram of a push-pull transistor amplifier;

Fig. 6 is an alternative form of push-pull transistor amplifier;

Fig. 7 is a diagrammatic perspective view of an alternative form of rotor to that shown in Fig. 1, in which the rotary shaft does not form a part of the mechanical oscillatory system;

Fig. 8 is a side elevation view of another form of rotor to that shown in Fig. 1, in which the two rotor discs are of different mass;

Fig. 9 is an end view of the rotor of Fig. 8;

Fig. 10 shows a detail modification of the constant speed motor of Fig. 1, showing means for providing a fine adjustment of the rotor speed;

Fig. 11 is a plan view of a constant speed electric motor having a single rotor disc and having the signal and drive coils and the associated ferromagnetic circuits connected together by a resilient connection comprising crossed leaf springs, and Fig. 12 is a side elevation of the motor of Fig. 11.

The motor of Fig. 1 has a first magnetic rotor disc 1 and a second magnetic rotor disc 2 mounted in spaced relationship on a common shaft 3.

The rotor disc 1 is a flat disc of hard ferromagnetic material castellated at the circumference to provide magnetic poles angularly spaced about the rotor axis designated 4. The poles are alternatively of north and south polarity and provide a plurality of pole pairs. The relevance of the number of poles to the operation of the device is described below. In the present example, the rotor disc 1 provides five pole pairs.

The rotor disc 2 similarly provides poles 5 of alternate polarity angularly spaced about the axis of rotor disc 2, there being five pole pairs as in rotor disc 1.

The rotor disc 1 is associated with a first soft magnetic circuit 6, 8 and 9 having a member 6 which passes through the axis of a drive coil 7. Attached to the member 6 are two soft magnetic core members 8 and 9 defining a gap in the magnetic circuit, in which gap the rotor disc 1 is mounted for rotation. The member 8 is shaped to provide spaced pole pieces 10 and the member 9 is shaped to provide spaced pole pieces 11. The pole pieces 10 are shaped to embrace similar poles of the rotor disc 1, a recess 12 being provided in the region of the intermediate pole of opposite polarity. The pole pieces 11 are similarly shaped to embrace similar poles of the rotor disc 1 and, since they are diametrically opposite to pole pieces 10, they embrace poles of opposite polarities from the pole pieces 10. Similarly, the member 9 is provided with a recess 13 in the neighbourhood of the intermediate pole to the two poles embraced by the pole pieces 11.

The rotor disc 2 is similarly associated with a second soft magnetic circuit, including a member 14 which passes through the axis of a signal coil 15. Connected to the member 14 are soft magnetic core members 16 and 17, which are shaped similarly to the members 8 and 9 of the first magnetic circuit, to provide respectively pole pieces 18 separated by a recess 19 and pole pieces 20 separated by a recess 21. In a similar manner to the first magnetic circuit, the pole pieces 18 and 20 define a gap in the magnetic circuit in which the rotor disc 2 is mounted for rotation. The pole pieces 18 embrace similar poles of the rotor disc 2 and the pole pieces 20 also embrace similar poles of the rotor disc 2, but poles of opposite polarity from those embraced by pole pieces 18.

The magnetic core members 6, 8 and 9 are secured to a rigid base member 25 and the magnetic core members 14, 16 and 17 are similarly secured to the same rigid base member 25. In Fig. 1, the central part of the base member is broken away for clarity. It will be appreciated, however, that the drive coil 7 is thereby rigidly connected to the signal coil 15.

In Fig. 1, the signal coil 15 is shown connected to the input of an amplifier unit 50 by conductors 53, 54 and the drive coil 7 is shown connected to the output of the amplifier unit 50 by conductors 51, 52.

The circuit diagram of Fig. 2 shows the signal coil 15 connected in the input circuit of a transistor amplifier 22 and the drive coil 7 connected in the output circuit of the transistor amplifier 22. The signal coil 15 is connected between the base electrode and the emitter elctrode of the transistor 22, the drive coil 7 is connected between the collector electrode of the transistor 22 and the negative terminal of a low voltage D.C. source 23 and the emitter electrode is connected to the positive terminal of the source 23.

To consider the operation of the device, it is first assumed that the moving part comprising rotor discs 1 and 2 and the common shaft 3 is provided with an initial rotation. It will be seen that in the position shown in Fig. 1 a magnetic flux will flow from the two poles of north polarity through the pole pieces 20, through the members 17, 14 and 16, and through the pole pieces 18 to the opposite south poles. After rotation of the rotor disc 2 through an angle equal to the angular spacing of adjacent poles, two south poles will be opposite the pole pieces 20 and two north poles will be opposite the pole pieces 18. Accordingly, the direction of the magnetic flux through the magnetic circuit will be reversed. The alternating magnetic flux through the member 14 and through the signal coil 15 induces electric voltage impulses of alternate polarity therein. These impulses are applied between the base and emitter electrodes of the transistor 22. A corresponding amplified current flows from the collector electrode of transistor 22 through the drive coil 7 and the voltage source 23. The amplified impulses of alternating polarity flowing through the drive coil 7 produce magnetic poles of alternating polarity between the members 8 and 9 and thus between the pole pieces 10 and 11. When the coils 15 and 7 are correctly phased, the amplified impulses in the drive coil 7 cause the rotating system, comprising rotor discs 1 and 2 and the connecting shaft 3, to rotate with increasing speed.

However, owing to the moment of inertia of the rotor discs 1 and 2 and the torsional resilience of the shaft 3, a torsional vibration is set up between the two rotor discs 1 and 2, the rotor discs moving relatively in opposite rotational senses. This torsional vibration is superimposed upon the rotation of the whole rotor assembly. That is to say, although both rotor disc 1 and rotor disc 2 necessarily perform the same number of revolutions, measured over a considerable interval of time, the rotational speed of the two rotor discs is likely to be different at any given instant. At any instant, the first rotor disc may be rotating more rapidly than the second. After an interval corresponding to one half of the period of torsional vibration, the second rotor disc will be rotating correspondingly more rapidly than the first, and so on.

In this example, the natural frequency of vibration of the system, comprising the two rotor discs 1, 2 and intervening common shaft 3, is made 60 cycles per second. That is, the moment of inertia of the rotor discs 1, 2 and the torsional elasticity of the shaft 3 are such as to give a natural frequency of torsional vibration of 60 c.p.s.

At the rotational speed of 720 r.p.m., that is 12 r.p.s., the ten poles alternating north and south of the rotor disc 2 induce impulses of frequency 60 c.p.s. in the signal coil 15. Amplified current impulses of frequency 60 c.p.s. similarly flow in the drive coil 7. Impulses of frequency 60 c.p.s. set the rotating system into torsional vibration at the resonant frequency thereof.

As the rotational speed of the system approaches 720 r.p.m. the torsional vibration builds up sharply in amplitude as is shown by the illustrative resonance curve of Fig. 3. In Fig. 3 the rotational speed of the system and the frequency of signal and drive impulses are shown along the horizontal axis and the amplitude of torsional vibration is shown along the vertical axis. The curve 24 shows the correlation between amplitude of vibration and frequency.

The rotational displacement of the driven rotor disc 1 relatively to the rotor disc 2, due to the torsional vibration, progressively reduces the driving effect of the driving impulses so that, in operation, the rotational speed never exceeds 720 r.p.m.

According to the present understanding of the operation of the motor of Fig. 1, the signal provided by the signal coil 15, which triggers the driving pulse to the driving coil 7, always occurs when the oscillation of the rotor disc 2 is superimposed upon the mean rotation of the rotary shaft 3. Hence, the time duration of the signal current is always less when the motor is running at resonant speed. The greater the amplitude of oscillation of the rotor discs 1 and 2, the less is the time duration of both the signal and driving impulses. Although the signal voltage induced is greater at a higher speed of the signal rotor disc 2, the transistor amplifier is designed so that the transistor "bottoms." Thus, increase in speed of the rotor disc 2 has no effect in increasing the amplitude of the driving impulses.

Figs. 4a and 4b show the amplitudes and time duration of the driving impulses when the amplifier is operating with a supply of 5 volts and 30 volts respectively. Since the driving current is proportional to the driving voltage, the shaped areas 26 and 28 respectively in Figs. 4a and 4b also represent the electrical magnitude of the impulses in ampere secs.

It will thus be seen that although the amplitude of the curve 28 is approximately six times that of the curve 26, the area under the curve 28 exceeds the area under the curve 26 by only a small amount. This amount is the amount required to supply the energy of oscillation of the rotor to achieve the greater amplitude of oscillation. The duration of the driving impulses is thereby reduced from about 16.7 milliseconds to about 3 milliseconds.

The drawing of Fig. 1 is diagrammatic only and, in a practical embodiment, a slightly different arrangement of the poles is preferred so that if one set of poles line up with each other, the other set of stator poles lie intermediately of the rotor poles.

It appears that if the runaway speed of the motor is kept to $\sqrt{2}$ times the controlled speed, the oscillations of the oscillatory system can build up in amplitude so as to return the rotor speed to the controlled speed if accidental conditions cause it to run away. The runaway speed can be kept to $\sqrt{2}$ times the controlled speed, either by arranging that the back EMF of the motor nearly approaches the EMF of the drive impulses at maximum rated voltage or by connecting a capacitor of value approximately 0.5 microfarad in parallel with the signal coil 15. It appears that the capacitor reduces the signal impulses to a greater extent at abnormally high frequencies than at the controlled frequency and hence it serves to limit the permissible rise in speed of the motor.

Some embodiments of motors according to the invention, which have been designed to provide a controlled speed in one direction may rotate at an uncontrolled speed in the reverse direction of rotation. Rotation in the reverse sense may be avoided by including in the motor construction means which permit rotation in only one sense and, in the event of initial rotation in the wrong sense, reverse the sense of rotation to the correct sense. Such means are known in themselves and do not form any part of this invention.

It is possible to find a pole pitch, a value of Q of the mechanical oscillator and a pole tooth lock which give a controlled rotor speed in either direction of rotation, if such is desired. For 20 mm. diameter rotor discs such as are used in the motor described in the following paragraph, it appears that the provision of 16 poles, instead of 10 poles, will achieve a controlled speed of rotation in either sense.

One practical embodiment of a motor of the form shown in Fig. 1 has two rotor discs each of 20 mm. diameter and 1 mm. thickness made of a hard magnetic material sold under the registered trademark "Vicalloy." The two rotor discs are mounted directly on a torsion shaft of 0.25 mm. diameter made of material sold under the registered trademark 'Ni Span C' and spaced apart from each other by ½". This arrangement provides a mechanical oscillator system having a natural frequency of oscillation of 60 cycles per second.

The stator pole pieces 8, 9, 16 and 17 are of softened mumetal (registered trademark) of 1 mm. thickness. The drive coil 7 has 12,000 turns of 47 S.W.G. copper wire and the signal coil 15 has 6,000 turns of 45 S.W.G. copper wire.

When this motor was arranged to drive a clock mechanism, it was found that a loading torque of 1 gram-centimetre on the centre seconds hand of the clock slowed the motor by the equivalent of only 5 seconds per day.

Fig. 5 shows a form of the amplifier 50 of Fig. 1 which is an alternative to the single transistor amplifier arrangement of Fig. 2. In the circuit arrangement of Fig. 5, an n-p-n transistor 30 has its base electrode connected to the base electrode of a p-n-p transistor 31. The signal coil 15 is connected between the common connected base electrodes and the common-connected emitter electrodes of the transistors 30, 31. The drive coil is, in this embodiment, divided into two parts, 7, 7' the part 7 being connected between the collector electrode of transistor 30 and the positive terminal of a battery 32. The negative terminal of battery 32 is connected to the common-connected emitter electrodes, as is also the positive terminal of a similar battery 33. The batteries 32, 33 may be a single 6 volt battery tapped at 3 volts, as shown in Fig. 5. The part 7' of the drive coil is connected between the collector electrode of transistor 31 and the negative terminal of battery 33.

Fig. 6 shows a further alternative arrangement for the amplifier 50 of Fig. 1. In the circuit arrangement of Fig. 6, the signal coil is divided into two parts, 15, 15' and the drive coil is similarly divided into two parts, 7, 7', as by a centre tap in each case. Two p-n-p transistors 30, 31, have their emitter electrodes connected together and to the positive terminal of a battery 23. The signal coil part 15 is connected between the base electrode of transistor 30 and the common-connected emitter electrodes. The signal coil part 15' is connected between the base electrode of transistor 31 and the common-connected emitter electrodes. The drive coil 7, 7' is connected between the collector electrode of transistor 30 and the collector electrode of transistor 31 and the junction between the two coil parts is connected to the negative terminal of battery 23.

Fig. 7 shows a detailed modification of the arrangement of Fig. 1 in which the rotary shaft 3 does not form a part of the mechanical oscillatory system. In the arrangement of Fig. 7, the two rotor discs 1 and 2 are interconnected by three leaf springs 35, 36 and 37. In this arrangement, the oscillation of the system results from the moment of inertia of the rotor discs 1 and 2 and the resilience of the springs 35, 36 and 37. The oscillatory movement of the rotor of Fig. 7 is superimposed upon the rotary motion thereof and the rotary motion is transmitted to the shaft 3 through a collet 38 which is attached at its centre to the shaft 3 and is attached to the springs 35, 36 and 37 substantially at their centres, which is an oscillatory displacement node.

A further alternative form of rotor is shown in Fig. 8. The rotor of Fig. 8 has rotor discs 1 and 2 of unequal mass, the mass of the rotor disc 1 being so much greater than the mass of rotor disc 2 that the rotor disc 1 can itself be considered as an oscillatory node, the whole of the oscillatory motion taking place in the rotor disc 2. In consequence, the rotor disc 1 can be directly connected to the rotary shaft 3 to impart solely the mean rotational movement of the rotor thereto.

As has been made clear herein, in the arrangement of Fig. 1 and in the modifications thereto described, the mean rotation of the rotor is substantially determined by the resonant frequency of oscillation of the rotor itself. A fine adjustment of speed may be provided, however, by external means and one convenient arrangement, which is already known in the art, is shown in Fig. 10. In the arrangement of Fig. 10, the rotor 1, 2, 3 is mounted in pivots 40, 42, the pivot 40 being carried by a bracket 41.

A spring 43 of magnetic material is mounted on bracket 41 and has one end 44 bent over and pointing towards the axis of the rotor disc 2. A knurled adjusting screw 45 enables the end 44 to be moved towards or away from the periphery of the rotor disc 2, to provide a fine adjustment of the speed of rotation of the rotor.

The embodiment of the invention shown in Figs. 11 and 12, differs from the embodiment shown in Fig. 1 in that the rotor is of rigid construction and the signal and drive coils are connected together by a resilient connection. In consequence, the signal coil and the associated magnetic circuit connected with the poles of the rotor form the mechanical oscillatory system instead. In the arrangement of Figs. 11 and 12, a rotor 60 provided with peripheral poles is fixed on a spindle 61. The ends of the spindle 61 are carried in pivots 62, 63, which are mounted respectively in a bracket 64 and a base 65 from which the bracket 64 is supported.

The signal coil 15 is wound on a soft magnetic core 66 having pole pieces 67, 68 arranged near the periphery of the rotor 60. The drive coil 7 is similarly wound on a core 69 of soft magnetic material having pole pieces 70, 71 correspondingly arranged near the periphery of the rotor 60. Mounted on the pieces 67, 68 respectively are insulating blocks 72, 73 and mounted on the pole pieces 70, 71 are insulating blocks 74, 75. Crossed leaf springs 76, 77 are connected respectively between the blocks 72, 75 and the blocks 73, 74.

In this arrangement, the mechanical oscillatory system is provided by the signal coils 15, the associated magnetic core 66 and the connecting springs 76, 77.

The driving coil 7 and associated core 69 are fixed to the base 65 by a mounting block 86. Thus, the driving coil 7 is fixed and the signal coil 15 and associated magnetic core 66 oscillate in an arc which is approximately centred at the axis of the rotor 60.

The leaf springs 76, 77 are mounted by insulating blocks 72, 73, 74 and 75, so that they may be used as electrical connections from the oscillating signal coil to the associated components fixed to the base 65. To this end, the signal coil 15 is electrically connected to the springs 76, 77 by conductors 87, 78 respectively. At the other ends, the springs 76, 77 are respectively connected to conductors 80, 79 which are connected to the input terminals of an amplifier 83. The output terminals of the amplifier 83 are connected by conductors 81, 82 to the drive coil 7.

The amplifier 83 may be identical with the amplifier 50 of Fig. 1 and may comprise any of the circuit arrangements shown in Figs. 2, 5 and 6.

I claim:

1. An electromechanical device comprising a rotor provided with a plurality of pairs of magnetic poles of opposite polarity, a magnetic circuit including a signal coil having poles co-operating with a first pair of rotor magnetic poles, a second magnetic circuit including a drive coil having poles co-operating with a second pair of rotor magnetic poles, an amplifier, means electrically connecting said signal coil to the amplifier to supply an input signal thereto as the rotor rotates, means to supply the drive coil from the output of the amplifier to supply driving impulses to the rotor, mechanical means connecting said signal coil to the drive coil, mechanical means connecting said first pair of rotor magnetic poles to said second pair of rotor magnetic poles, one of said mechanical means comprising a resilient member forming part of a mechanical oscillatory system, the resonant frequency of which system substantially determines the rotational speed of said rotor.

2. An electromechanical device as in claim 1 in which the signal coil is rigidly connected to the drive coil and the first pair of rotor magnetic poles is resiliently connected to the second pair thereof whereby the rotor comprises a mechanical oscillatory system.

3. An electromechanical device as in claim 1 in which the signal coil is resiliently connected to the drive coil, and the first pair of rotor magnetic poles is rigidly connected to the second pair.

4. An electromechanical device as in claim 1 in which the rotor comprises first and second rotor disks, each rotor disk being provided with a plurality of peripheral poles of opposite polarity, said disks being arranged in spaced relationship and mounted on a rotary shaft and being connected to each other by a resilient mechanical connection, one of said disks being associated with the magnetic circuit of the signal coil, the other of said disks being associated with the magnetic circuit of the drive coil.

5. An electromechanical device as in claim 4 in which the first rotor disk is disposed in a gap of the magnetic circuit passing through the signal coil and the second rotor disk is disposed in a gap of the magnetic circuit passing through the drive coil, both rotor disks being so arranged in the respective gaps that the directions of the magnetic flux in each of the magnetic circuits alternate as the rotor disks rotate.

6. An electromechanical device as in claim 4 in which the first and second rotor disks are carried by a rotary shaft and the first and second rotor disks together with the intervening portion of said rotary shaft form a torsional oscillator, the resonant frequency of which substantially determines the speed of the rotor.

7. An electromechanical device as in claim 4 in which the means connecting said rotor disks comprise a plurality of flexible members attached to the rotor disks at points radially displaced from the axis of said disks to form with said disks a torsional oscillator, the resonant frequency of which substantially determines the rotational speed of the rotor, and said flexible members are secured adjacent their intermediate portions to a rotatable shaft extending transversely to the planes of the disks.

8. An electromechanical device as in claim 4 comprising a member of magnetic material mounted for movement to vary the reluctance between said member and one of the rotor disks, and means to alter the position of said member to provide a fine adjustment of the rotational speed of the rotor.

9. An electromechanical device as in claim 1 in which the amplifier is a transistor amplifier comprising an n-p-n transistor, a p-n-p transistor and two direct current sources, and the drive coil is divided into two parts, one part of the drive coil being connected in series with one of the sources between the collector and the emitter of one transistor, the other part of the drive coil being connected in series with the other source between the collector and the emitter of the other transistor, the bases and emitters of the transistors being connected together, the signal coil being connected between the bases and the emitters.

10. An electromechanical device as in claim 1 in which the amplifier is a transistor amplifier comprising two p-n-p transistors and a direct current source, and the drive and signal coils are both divided into two parts, the parts of the signal coils being connected between the bases and the emitters of the respective transistors, one end of each part of the drive coil being connected to the collector of one transistor, the other ends of the drive coil parts being joined, the emitters of the two transistors being connected, the source being connected between the joined ends of the drive coil parts and the emitters.

No references cited.